(12) United States Patent
Keith et al.

(10) Patent No.: US 7,953,755 B2
(45) Date of Patent: May 31, 2011

(54) SEMANTIC RELATIONAL DATABASE

(75) Inventors: Dean Edward Keith, Howell, MI (US); Dennis Albert Keith, Harrison, MI (US); Sarah Moss Keith, Howell, MI (US)

(73) Assignee: Dataura LLC, Howell, MI (US)

( * ) Notice: Subject to any disclaimer, the term of this patent is extended or adjusted under 35 U.S.C. 154(b) by 513 days.

(21) Appl. No.: 12/079,030

(22) Filed: Mar. 24, 2008

(65) Prior Publication Data

US 2009/0240714 A1    Sep. 24, 2009

(51) Int. Cl.
 *G06F 17/30*    (2006.01)
(52) U.S. Cl. ........................................ 707/790
(58) Field of Classification Search ............... 707/4, 102
 See application file for complete search history.

(56) References Cited

U.S. PATENT DOCUMENTS

| | | | |
|---|---|---|---|
| 5,809,297 | A | 9/1998 | Kroenke et al. |
| 6,640,231 | B1 | 10/2003 | Anderson et al. |
| 6,760,746 | B1 * | 7/2004 | Schneider ............... 709/203 |
| 6,895,430 | B1 * | 5/2005 | Schneider ............... 709/217 |
| 7,293,010 | B2 | 11/2007 | Angele et al. |
| 7,293,026 | B1 | 11/2007 | Ricci |
| 7,295,719 | B2 | 11/2007 | Robertson et al. |
| 7,328,209 | B2 | 2/2008 | Das et al. |
| 2008/0005342 | A1 * | 1/2008 | Schneider ............... 709/230 |
| 2008/0059607 | A1 * | 3/2008 | Schneider ............... 709/218 |
| 2009/0112835 | A1 * | 4/2009 | Elder ..................... 707/4 |

FOREIGN PATENT DOCUMENTS

WO    WO 2004-053633    6/2004

OTHER PUBLICATIONS

S. Ram et al., "Semantic-Model Support for Geographic Information Systems", Computer IEEE, May, 1999, pp. 74-81.
"The Associative Model of Data White Paper", Lazysoft Technology, Copyright 2003, Answerbrisk Limited, pp. 1-16.
C. Vanderhoeft, "An Implementation of Formal Semantics in the Formalism of Relational Databases". International Conference on Computational Linguistics, Proceedings of the 13*th* Conference on Computational Linguistics—vol. 2, Helsinki, Finland, Year of Publication 1990, pp. 377-382.
Q. Trinh, et al., "Semantic Interoperability Between Relational Database Systems", Database Engineering and Applications Symposium, 2007. IDEAS 2007. 11*th* International Volume, Issue, Sep. 6-8, 2007 pp. 208-215.
T. Hirao, "Extension of the Relational Database Semantic Processing Model", IBM Systems Journal, vol. 29, No. 4, 1990, pp. 539-550.

(Continued)

*Primary Examiner* — Don Wong
*Assistant Examiner* — Sheree N Brown
(74) *Attorney, Agent, or Firm* — Harness, Dickey & Pierce, P.L.C.

(57) ABSTRACT

A semantic relational database has a phrase registry data store of definitions and data handlers that syntactically traverse sentences and report word phrases of relationships defined by the sentences. In some aspects, the database has a sentence data structure in which a sentence refers to another sentence by containing a sentence phrase definition for the other sentence. In other aspects, the database has a sub-sentence data structure that stores sentences as sub-sentences having syntax types specified by a syntax type data structure. A modified relationship is obtained by one sub-sentence being designated to modify another sub-sentence of the same sentence.

38 Claims, 6 Drawing Sheets

OTHER PUBLICATIONS

R. Schmelzer, "Semantic Integration: Loosely Coupling the Meaning of Data", Document ID: ZapFlash-08082003, Posted: Aug. 8, 2003.

D. B. Farmer, et al. The Semantic Database Constructor, IEEE Transactions on Software Engineering, vol. 11, Issue 7 (Jul. 1985), pp. 583-591, ISSN:0098-5589.

S. Buxton, "Beyond Search: Content Applications", IEEE Computer Society, Enterprise Search, Jan./Feb. 2007 IT Pro, pp. 29-35.

J. Soukup, et al. "The Inevitable Cycle: Graphic Tools and Programming Paradigms", IEEE Computer Society, Persectives, Aug. 2007, pp. 24-30.

X. Shi, "Semantic Web Services: An Unfilled Promise", Perspectives, Jul./Aug. 2007 IT Pro, pp. 42-45.

B. Lewis, "A Glimpse at the Future of Enterprise Search", IEEE Computer Society, Jan./Feb. 2007 IT Pro, pp. 12-13.

D. Bean, "How Advances in Search Combine Databases, Sentence Diagramming, and "Just the Facts"", IEEE Computer Society, Enterprise Search, Jan./Feb. 2007 IT Pro, pp. 14-19.

D. Geer, "Making 3D Technology Universal", IEEE Computer Society, Technology News, Aug. 2005, pp. 23-25.

H. Gao, et al., "Integrating Biological Research through Web Services", IEEE Computer Society, Computing Practices, Mar. 2005, pp. 26-31.

H. Zhuge, "The Future Interconnection Environment", IEEE Computer Society, Perspectives, Apr. 2005, pp. 27-33.

D. Geer, "Will Binary XML Speed Network Traffic?", IEEE Computer Society, Industry Trends, Apr. 2005, pp. 16-18.

J. Thilmany, "Ephemeral Warehouse", Mechanical Engineering, Sep. 2005, pp. 30-32.

D. Kroenke, "Beyond the Relational Database Model", IEEE Computer Society, IT Systems Perspectives, May 2005, pp. 89-90.

G. Stix, "The Elusive Goal of Machine Translation" Scientific American, Mar. 2006, pp. 92-95.

J. Thilmany, "Translation Time", Mechanical Engineering, Oct. 2006, pp. 34-36.

J. Thilmany, "Common Language—Engineering Information Can Make It Over To Accounting And Marketing With The Help Of XML", Mechanical Engineering, Dec. 2006, pp. 38-40.

T. Berners-Lee, "Welcome To The Semantic Web", Science, The World in 2007.

D. Kroenke, "Beyond The Relational Database Model", IEEE Computer Society, IT Systems Perspective, May 2005, pp. 89-90.

Feigenbaum, et al., "The Semantic Web In Action", Information Technology, Scientific American, Dec. 2007, pp. 90-97.

H. Zhao, et al., "Semantic Model Based Heterogeneous Databases Integration Platform", IEEE Computer Society, Third International Conference on Natural Computation (ICNC 2007).

D. Dou, et al., "Integrating Databases Into The Semantic Web Through An Ontology-Based Framework", IEEE Computer Society, Proceedings of the $22^{nd}$ International Conference on Data Engineering Workshops (ICDEW'06).

S. Liu, "Enabling Electronic Healthcare Information Exchange", IEEE Computer Society, Nov./Dec. 2007 IT Pro, pp. 17-23.

\* cited by examiner

PhraseTypeTable (simple)

| PhraseTypeKey | PhraseTypeName |
|---|---|
| T1 | Word-Phrase |
| T2 | Sentence |
| T3 | Picture |
| T4 | Timestamp |

202

SentenceTripletTable

| SentencePhraseKey | SubjectPhraseKey | VerbPhraseKey | ObjectPhraseKey |
|---|---|---|---|
| S1 | P1(John) | R1(Favorite) | A1(Fiat) |
| S2 | P2(Paul) | R1(Favorite) | A1(Fiat) |
| S3 | P3(George) | R1(Favorite) | A3(BMW) |
| S4 | P4(Ringo) | R1(Favorite) | A4(Lamborghini) |
| S5 | P1(John) | R2(Owns) | A2(Chevrolet) |
| S6 | P2(Paul) | R2(Owns) | A2(Chevrolet) |
| S7 | P3(George) | R2(Owns) | A2(Chevrolet) |
| S8 | P4(Ringo) | R2(Owns) | A2(Chevrolet) |
| S9 | P1(John) | R5(Entered) | S1(Sentence1) |

204

PhraseRegistryTable

| PhraseKey | PhraseTypeKey | PhraseName |
|---|---|---|
| P1 | T1(Word) | John |
| P2 | T1(Word) | Paul |
| P3 | T1(Word) | George |
| P4 | T1(Word) | Ringo |
| A1 | T1(Word) | Fiat |
| A2 | T1(Word) | Chevrolet |
| A3 | T1(Word) | BMW |
| A4 | T1(Word) | Lamborghini |
| R1 | T1(Word) | Favorite is |
| R2 | T1(Word) | Owns |
| R3 | T1(Word) | Looking for |
| R4 | T1(Word) | Used to own |
| R5 | T1(Word) | Entered the data |
| D1 | T4(Timestamp) | 9-10-99/3:10:10 |
| S1 | T2(Sentence) | |
| S2 | T2(Sentence) | |
| S3 | T2(Sentence) | |
| S4 | T2(Sentence) | |
| S5 | T2(Sentence) | |
| S6 | T2(Sentence) | |
| S7 | T2(Sentence) | |
| S8 | T2(Sentence) | |
| S9 | T2(Sentence) | |

PhraseTypeTable (robust)

| PhraseTypeKey | PhraseTypeName | PhraseValueTableName | PhraseTypeHandler |
|---|---|---|---|
| T1 | Word-Phrase | | DefaultPhraseHandler |
| T2 | Sentence | | SentencePhraseHandler |
| T3 | Picture | ValuePictureTable | PicturePhraseHandler |
| T4 | Timestamp | ValueTimestampTable | TimestampPhraseHandler |

206

ValuePictureTable

| PhraseKey | PictureValue (or PictureFileReference) |
|---|---|
| PP1 | DATURALOGO.BMP |
| PP2 | WESTINGHOUSELOGO.BMP |
| PP3 | GELOGO.BMP |
| PP4 | MOTORABCNAMEPLATE.BMP |

204A

ValueTimestampTable

| PhraseKey | TimestampValue |
|---|---|
| PP6 | 2008/01/01 23:00:44 gmt |
| PP7 | 2008/01/01 23:01:46 gmt |
| PP8 | 2008/01/01 23:05:03 gmt |
| PP9 | 2008/01/02 04:40:09 gmt |

204B

*Fig. 2B* ns having constraints that
SEMANTIC RELATIONAL DATABASE

FIELD

The present disclosure generally relates to relational databases, and relates in particular to a semantic relational database.

BACKGROUND

Today's relational databases can be organized in a couple of ways. For example, relational databases can be organized where entities and properties are stored as tuples (rows or records) and attributes (columns or fields) of entity tables, and relationships between entities are stored as tuples in relationship tables. Also, another type of relational database is organized where tuples are holding relationship triplets.

A table of tuples can record many attributes in a row of cells. But these tuples are notoriously inefficient. The tuples are inefficient because each row of the table must have the same number and type of cells. In other words, the longest row determines the size of the table, which leads to many empty cells in other rows. As a result, the tuples consume a large amount of computer memory, and tax the processing power of the computer. Splitting the table can be used to lessen the number of empty cells, but at the cost of increased software complexity. For example, and referring generally to FIG. 1A, there can be a "people" table 101 and an "automaker" table 102. Properties of people and automaker entities are stored as attributes in the tuple. A "favorite" relationship table 103 records in tuples that a particular "person" entity is related to an "automaker" entity by the implied "favorite" relationship. So a relationship is recorded that a person has a favorite automaker.

A table of relationship triplets is more flexible than standard tuple storage of separate relationship tables. The triplets are stored in tables each having two columns for recording entities and one column for recording relationship types. These entities are recorded in entity tables, in which each entity table may be of a certain type. The relationship types are recorded in a relationship type table. For example, and as before, referring generally to FIG. 1A, there can be a "people" table 101 and an "automaker" table 102. Instead of the "favorite" relationship table 103, there is a "relationship triplet" table 105. This triplet table records in tuples that a primary entity is related to a secondary entity by the explicit relationship type, defined in the relationship type table 104. So a relationship is recorded that a person has a favorite automaker, or that a person owns a car made by an automaker. Again, properties of people and automaker entities are stored as attributes in the tuple. This makes it difficult to combine the entity tables to allow the capability to record that an automaker has a favorite automaker, or that a person has a favorite person.

The relationship tables each typically have constraints that limit which types of entities are eligible to be placed in which column. For example, the "favorite" table 103 can have constraints that cause an exception to be thrown if a process attempts to place any entity not from the "person" table 100 in its leftmost column. Similarly, the "favorite" table 103 can have constraints that cause an exception to be thrown if a process attempts to place any entity that is not from the "automaker" table 102 in its rightmost column. Accordingly, the "favorite" table 103 would not record that an automaker has a favorite person, a person has a favorite person, or an automaker has a favorite automaker. On the other hand, if it is desirable to allow a relationship to be recorded that a person has a favorite person, the constraints can permit this type of relationship to be recorded. Similarly, the relationship triplet table 105 has the same constraint situation.

An index and retrieval system of a typical relational database searches the database contents employing a number of different operators that perform relational algebra. In a simple example, the index and retrieval system searches for all incidences of a queried entity or relationship. For example, a search query consisting of the name of a certain person returns every triplet containing that person and reports the entities in each column and the relationship in a "semantic" fashion. In other words, if a query asks for "John," then a search of the triplet table 105 is performed for every triplet containing the search term, thus obtaining results reporting that "John favors FIAT™." Similarly, a query that asks for "FIAT™" causes a search of the triplet table 105 for every triplet containing the search term, thus obtaining results reporting that "FIAT™ is favored by John," and "FIAT™ is favored by Paul." The active or passive voice can be used to communicate the column in which each entity was found. Further, a query that asks for the relationship, "favorite," causes search of the triplet table 105 and obtains results reporting that "John favors FIAT™," "Paul favors FIAT™," "George favors BMW™," and "Ringo favors LAMBORGHINI™."

Relational databases have proven useful, leading to the development of many relational database implementations of custom design. In the past, each type of entity and each type of relationship has been defined in advance of use of the relational database. When it becomes necessary to define another type of entity or relationship, the databases have to be entirely reconstructed. Much effort has gone into attempting to automate, as much as possible, the process of deconstructing the legacy database 106 and porting the data into a new database that has the new characteristics. Much work has also gone into attempting to automate the construction of a relational database by mining data and constructing the relational database by observing semantics of the data and trying to instantiate the relationship based on the semantics. But there is still no way to dynamically extend the capabilities of a relational database without having to reconstruct the database.

The difficulty in solving the aforementioned problem stems from limitations that have been prohibitive. The difficulties are:

Tables that hold "triplets" of Entity-Relation-Entity are efficient for representing relations, but the model does not fit enough of the subtleties of data definition to define other data constructs.

Spreadsheet-style tables contain rows with many empty columns.

Multi-dimensional information is highly variable and usually requires custom tables.

The statements in this section merely provide background information related to the present disclosure and may not constitute prior art.

SUMMARY

A semantic relational database has a phrase registry data store of definitions and data handlers that syntactically traverse sentences and report word phrases of relationships defined by the sentences. In some aspects, the database has a sentence data structure in which a sentence refers to another sentence by containing a sentence phrase definition for the other sentence. In other aspects, the database has a sub-sentence data structure that stores sentences as sub-sentences having syntax types specified by a syntax type data structure. A modifying capability is obtained by one sub-sentence being designated to modify another sub-sentence of the same sentence.

Further areas of applicability will become apparent from the description provided herein. It should be understood that the description and specific examples are intended for purposes of illustration only and are not intended to limit the scope of the present disclosure.

DRAWINGS

FIG. 2A is a graphical representation illustrating a semantic relational database data structures defining self-referencing sentences.

FIG. 2B is a graphical representation illustrating data structures for handling multiple types of data.

The drawings described herein are for illustration purposes only and are not intended to limit the scope of the present disclosure in any way.

DETAILED DESCRIPTION

The semantic relational database disclosed herein implements a universal database system design, based on a combination of a standard relational database structure and a robust semantic structure. In one design, it provides the capability of replacing the physical and much of the application layers of any traditionally custom-designed database with one uniform, flexible system. It compares favorably as a replacement for both third-normal forms and fact-table forms.

The semantic relational database has a number of characteristics. For example, it is pre-designed to physically hold any data in an ultra-normalized and efficient manner, without foreknowledge of its logical content or structure, separating the physical design from the logical design. Not only does this avoid the custom programming necessary for new or changing systems, but it avoids having to change the logical structure of imported data. Additionally, linear scalability is achieved through its modularity and uniformity, creating systems of any size and type by replication of the basic components. This allows unlimited combinations of relationships without exponential growth. Also, both user concurrency and database management processing concurrency are linearly scalable. Therefore, hosting, thread management, and other services can be more securely combined. Further, secure, cooperative sharing between companies, departments and platforms can be achieved through its uniformity and other mechanisms. Not only is it easy to establish sharing arrangements, it is expected as a normal part of business. Moreover, any combination of traditional SQL relational database management system (DBMS) products can be used to build the semantic relational database. This allows easier integration into existing systems and data. Further still, the combinations of efficient storage, shared semantics, shared data, secure hosting discrimination, and other advantages offer the possibilities of great savings in energy, equipment, manpower, and system integration. Finally, future optimization advantages are realized when the methodology is incorporated into (or accounted for by) future DBMS products.

Figure 1A:
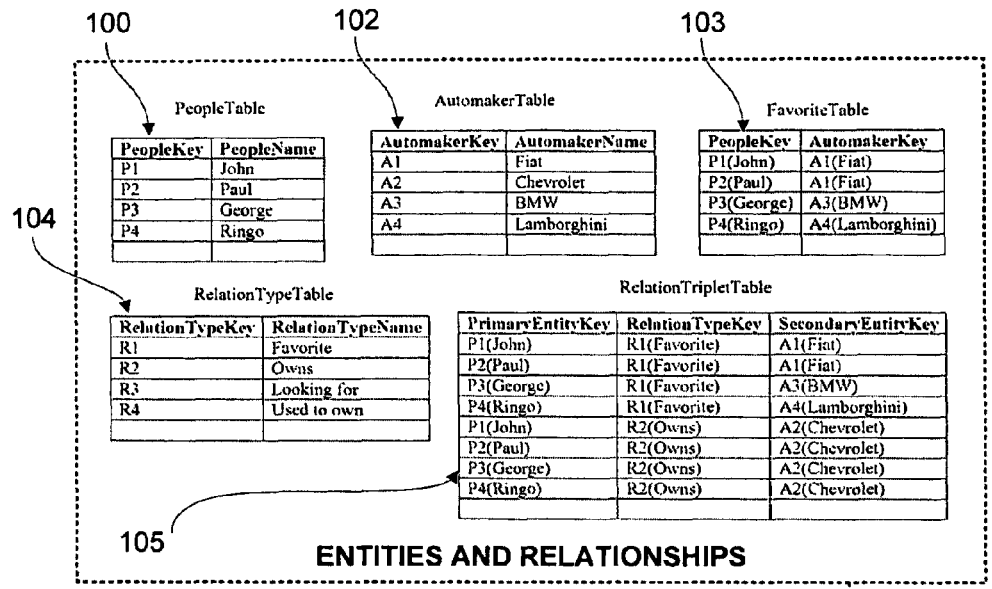
FIG. 1A is a block diagram illustrating a semantic relational database incorporating data from a legacy relational database.
Figure 1B:
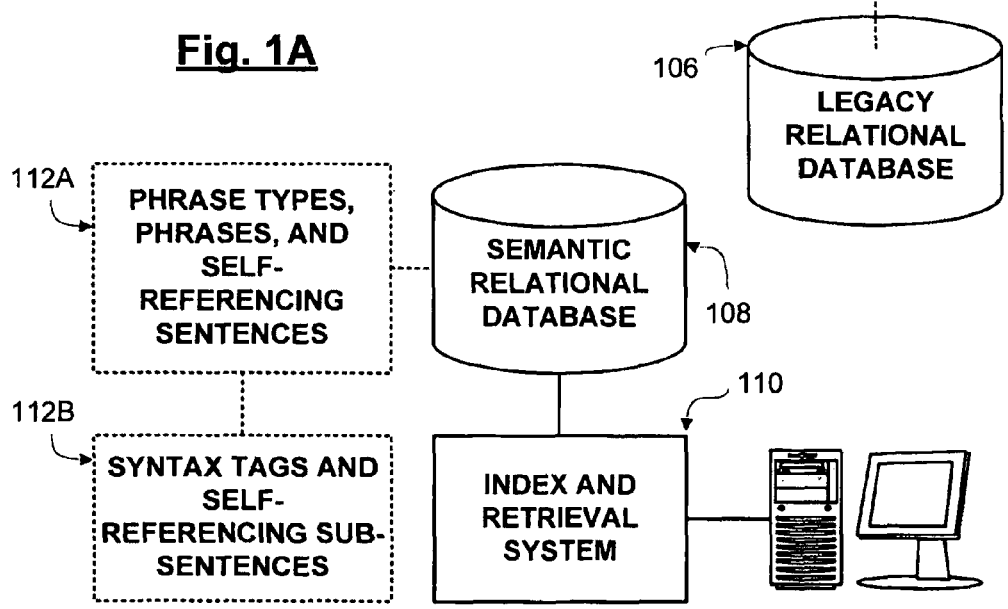
FIG. 1B is a block diagram illustrating a semantic relational database having data structures in accordance with the present disclosure.

With reference to FIG. 1B, the semantic relational database 108 has a number of uses. For example, the system can be assembled to create an engineering design system, a business operations system, a data warehouse system, or replace any existing database system design. Additionally, the system components can be assembled to create a new subsystem in any existing system, extending and integrating with it to add greater capabilities less expensively. Also, the system can be used to create application products less expensively through shared data management techniques. This allows the ability to service markets previously considered too small.

Some embodiments of the system are created from a set of basic components that can be assembled in various ways to create the multiple subsystems of a complete system. The basic components are: (a) a universal data container, of a semantic relational design, which can be replicated multiple times to hold any and all data, including system data and metadata; (b) a global, multi-part key that coordinates management, sharing, and partitioning for each data item; and (c) an organization of control tables, keys, constraints, and methods to tie it all together.

As further explained below with reference to FIG. 2, some embodiments of the semantic relational database 108 define a data container that implements data structures 112A recording phrase types, phrase definitions, and self-referencing sentences. For these embodiments, index and retrieval system 110 is adapted to process queries by syntactically traversing the self-referencing sentences. In other words, it can be determined how an entity is related to a relationship of entities, how a relationship exists between an entity and a relationship, and/or how a relationship exists between two relationships. For example, it can be determined that a person entered data recording a relationship between two entities. The semantic relational database is implemented in a tangible non-transitory computer readable medium.

As further explained below with reference to FIG. 4, alternative or additional embodiments of the semantic relational database 108 have a data container that implements data structures 112B recording syntax types and self-referencing sub-sentences. These data structures 112B are in addition to the data structures 112A. For these embodiments, index and retrieval system 110 is adapted to process queries by syntactically traversing the self-referencing sentences and sub-sentences according to the syntax types. In other words, it is additionally determined how a relationship and/or entity is modified by another entity and/or relationship. For example, it can be determined that a person, at a particular time, entered data recording a relationship between two entities.

Turning now to FIG. 2, the data container's center takes the form of a table 200. This table logically acts as the core of a universal, virtual table, made of a small number of physical tables. Each entity or relation type is put into the same virtual table instead of the separate tables of a traditional, legacy database design. For example, people, products, and orders are traditionally kept in separate tables. But in the data container of the disclosed semantic relational database, the data entities of every type are all put together into the same virtual "table".

With every entity in one table, then any "row" can contain any "column". Additionally, with everything in one table, then it is also possible to relate any "row" to any other "row". By further storing relationships in the same table 200, flexibility is obtained by creating any type of relation between any entities in an unlimited manner all in the same virtual table. Since complexity in a database is related to the number of tables squared, complexity is minimal with one table. This table 200 turns the efficient "triplet" into a more robust structure that allows more subtleties and dimensions of data definition.

Words and numbers are not the only phrase types. By adding a PhraseTypeTable 202, Phrases can contain other types of data, such as pictures, timestamps, and sound. Extra values of each type are stored in separate "Value" tables, such as "ValuePicture" 204A, "ValueTimestamp" 204B, or "ValueSound", each mapped to the appropriate Phrase Key. A full PhraseTypeTable 206 relates PhraseTypeKey to PhraseTypeName, and adds PhraseValueTableName, and PhraseTypeHandler. In the table 200, the phrase key row contains the phrase type key. This information allows retrieval of the phrase value and the data handler for phrases of that type. Therefore, types of phrases are word-phrases (phrase type key T1), sentences (phrase type key T2), pictures (phrase type key T3), timestamps (phrase type key T4), sounds, etc.

The sentence data handler is for handling relations defined by sentence table 204. The sentences are triplets that are labeled with a sentence key S1-S9. Each sentence is also defined as a phrase in the table 200. Sentences can therefore refer to other sentences, creating a self-referential ability to define metadata and system data. One can even say "This sentence is false". An example of a self-referencing sentence S9 is a triplet that records an "entered" relationship of "John" to another sentence, S1. Consider the case in which sentence S1 records that a "favorite" relationship exists of "John" to "FIAT™." When the semantic index and retrieval system retrieves the sentence S9, it observes the word-phrase data handler T1 for the subject, "John," and for the verb, "entered." It also observes the sentence phrase type key T2 for the predicate object, sentence S1. Therefore, it knows to use the word-phrase data handler for "John" and for "entered," and it knows to use the sentence data handler T2 to syntactically traverse the sentence S1. Traversing the sentence S1 encounters the data handler type T1 for each of the subject, verb, and predicate of the sentence S1. Since all sentences have now been syntactically traversed, the results of the traversing are obtained in the form, "John entered 'John favors FIAT™.'" If the same sentence is encountered over again in trying to iteratively traverse the sentences, then a circular sentence is detected, and an exception may be thrown.

There are a number of features here that make it possible to extend a semantic relational database without having to reconstruct the database. For example, it is possible to add new types of data by adding new data handlers for the new types of data. Also, the indexing process for placing the new data into table 200 always labels the new data by its phrase type key so that it can be handled when a sentence is syntactically traversed. Additionally, the labeling of the sentences with sentence phrase keys allows the sentences to be placed in the table 200 as entities. Existences of the sentences as entities, combined with constraints on the relations of the sentence table that permit a sentence to be a subject or predicate object of a sentence, provides the self-reference capability. Each sentence is a mixture of data types, allowing attributes of entities to be of different types. This accomplishes functions that are impossible with typical relational databases.

Consider, for example, the case in which a user needs to record a relation expressing which entity entered a relationship. In this case, the relationship has not yet been recorded. So it is not possible to have an entity in existence for "John favors FIAT™" unless one creates an entity for every possible relationship that can be recorded in the relational database. In that case, one could have a relationship "entered" that can take an entity "John" as a subject and an entity "John favors FIAT™" as a predicate. But the number of entities resulting from having to consider every possible combination and permutation of recordable relationships is prohibitive.

Consider also the case in which a user needs to record, "Paul entered 'John entered 'John favors FIAT™.'"" Now there is a need for an entity, "John entered 'John favors FIAT™'" And what about, "Ringo entered 'Paul entered 'John entered 'John favors FIAT™,'"" and "John entered 'Ringo entered 'Paul entered 'John entered 'John favors FIAT™,'""" From these examples, it can readily be appreciated that creating all of the entities needed to anticipate all of the permutations and combinations of everything that can be "entered" will consume infinite space and time. In other words, it is impossible to accomplish.

In contrast to the typical relational database design, the disclosed semantic relational database can extend the functionality of a legacy database dynamically. In the example of the "entered" relation, this relation type is simply added to the table 200, and constraints on the relation type permit sentences (i.e., instances of previously defined relations) to be related to other entities by the "entered" relation type. Therefore, one can create a new relation instance such as 'John favors FIAT™,' and then create another relation, 'John entered 'John favors FIAT™,'" without any need to anticipate any relationship instantiations. It follows that one can also successfully instantiate "John entered 'Ringo entered 'Paul entered 'John entered 'John favors FIAT™.'""" Nevertheless, some embodiments of the disclosed semantic relational database exhibit even more power and flexibility as explained below with reference to FIG. 3 and FIG. 4.

Figure 3:
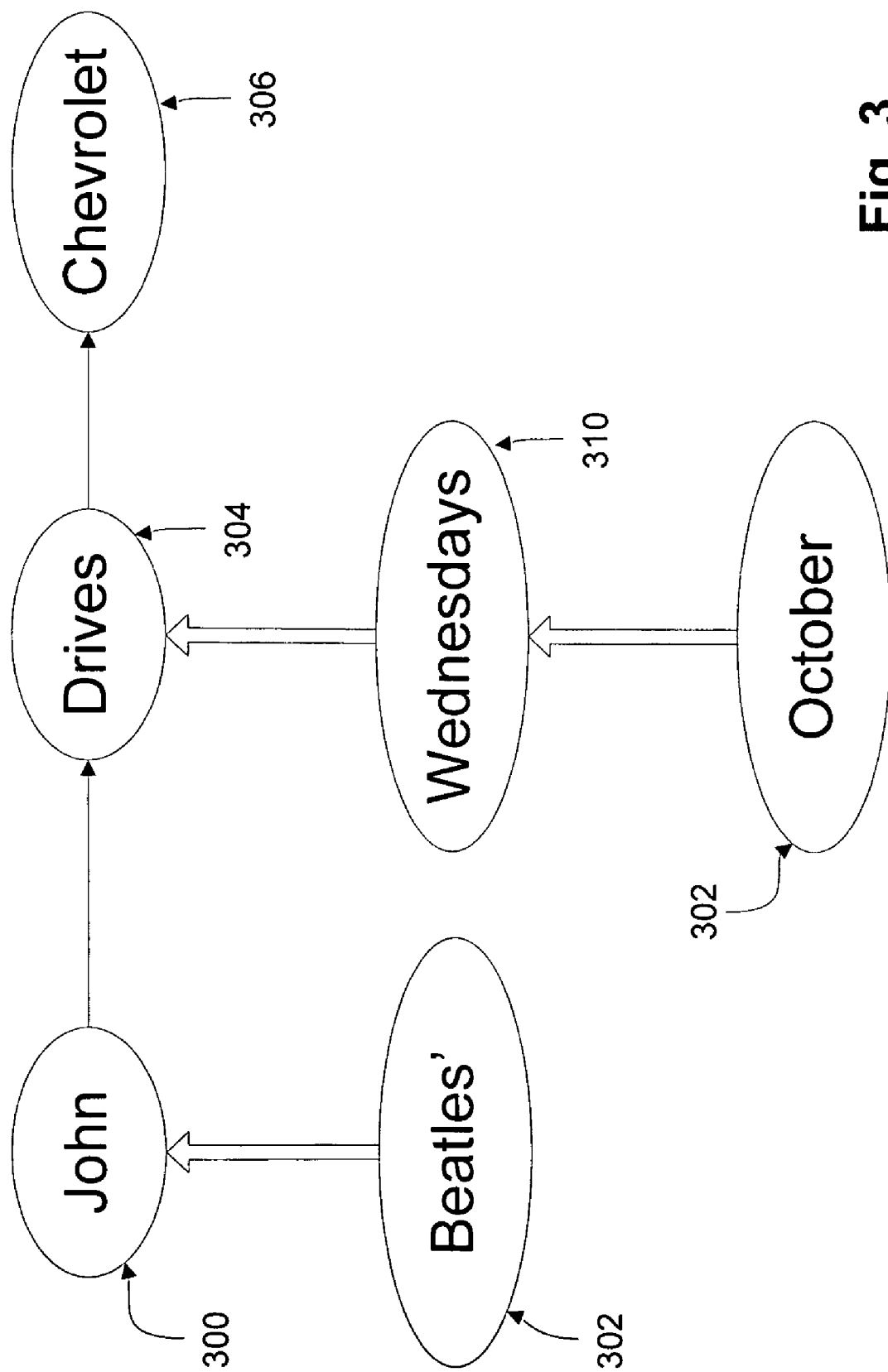
FIG. 3 is a data diagram illustrating semantics achieved by self-referencing sub-sentences.

Turning now to FIG. 3, use of a full sentence diagram, allows expression of any data which can be expressed as a sentence, not just relations. Theoretically, that is everything. For example, instead of saying "John drives a Chevrolet", you can say more complex things, such as "John 300 of the Beatles 302 drives 304 a Chevrolet 306 on October 308 Wednesdays 310."

Figure 4:
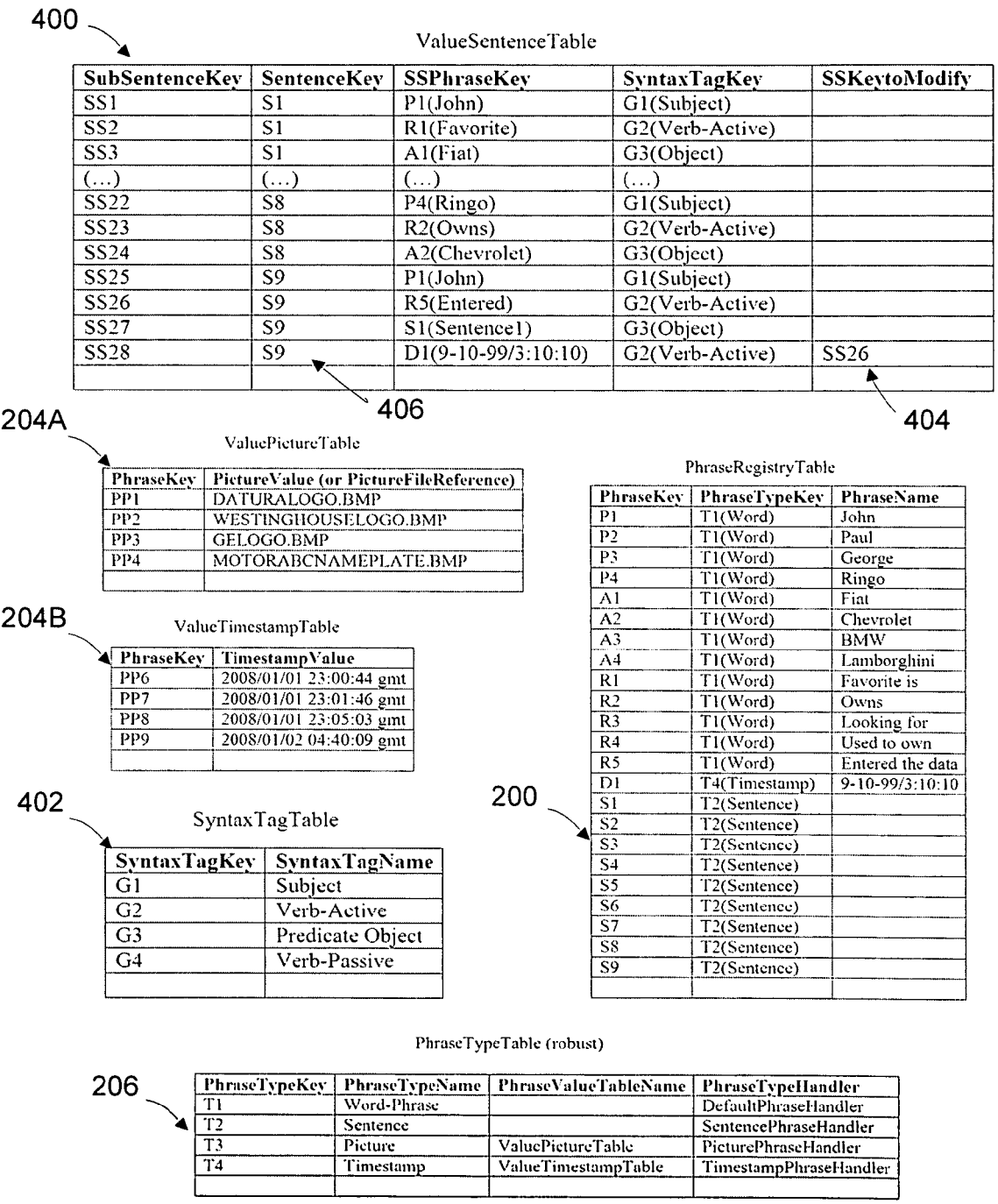
FIG. 4 is a graphical representation illustrating a semantic relational database data structures defining self-referencing sub-sentences.

Turning now to FIG. 4, some embodiments add more phrases to create full sentence diagrams. In other words, the phrases of the SentenceTable are normalized by splitting each row into SubSentences organized into a full sentence table 400 using syntax tag keys G1-G4 of a SyntaxTagTable 402, and adding a column 404 to connect the SubSentences that act as modifiers. This full sentence table 400 has a column 406 that labels each sub-sentence with a sentence key S1-S9 to identify the sentence to which it belongs. Each sub-sentence is also labeled with a unique sub-sentence key SS1-SS28. A sub-sentence key can be added to the column 404 in order to indicate that one sub-sentence modifies another sub-sentence of the same sentence.

Consider, for example, that sentence 1 is composed of sub-sentences SS1-SS3, in which sub-sentence SS1 specifies the entity "John" P1 and the syntax tag key "Subject" G1. Meanwhile, sub-sentence SS2 specifies the entity "Favorite" R1 and the syntax tag key "Verb-Active" G2, while sub-sentence SS3 specifies the entity "FIAT™" A1 and the syntax tag key "Object" G3. In this case, the retrieval process will retrieve sentence S1 by employing the sentence data handler T2, which syntactically traverses sentence S1 according to the syntax tag keys and the appropriate entity data handlers as, "John favors FIAT™."

Consider also that sentence S9 is composed of sub-sentences SS25-SS28, in which SS25 specifies the entity "John" P1 and the syntax tag key "Subject" G1. Meanwhile, sub-sentence SS26 specifies the entity "Entered" R5 and the syntax tag key "Verb-Active" G2, while sub-sentence SS27 specifies the entity "Sentence 1" S1 and the syntax tag key "Predicate Object" G3. At the same time, sub-sentence SS28 specifies the entity "9-10-99/3:10:10," the syntax tag key "Verb-Active" G2, and a modified sub-sentence SS26. In this case, the retrieval process will retrieve sentence S9 by employing the sentence data handler T2, which syntactically traverses sentence S9 according to the syntax tag keys and the appropriate data handlers as, "John entered (sentence 1) at 3 PM on Sep. 10, 1999." Flattened, this sentence becomes "John entered 'John favors FIAT™' at 3 PM on Sep. 10, 1999." Moreover, the retrieval process can operate on any of these entities to retrieve all sentences containing a sub-sentence specifying the entity. This functionality is far and away above the capabilities of a typical relational database.

Consider, for example, the case in which a user of a typical relational database needs to record a relation expressing the time at which an entity was related to another entity. For example, if the entities "John" and "FIAT™" exist, and the relation "favorite" exists, then it is possible to say, "John favors FIAT™." But how does one say "John at 3 pm on Sep. 10, 1999 favors FIAT™." One could create a new relational database with the entity, "John at 3 pm on Sep. 10, 1999," or with the relation, "at 3 pm on Sep. 10, 1999 favors." But the database would have to be completely reconstructed. Also, it would not be possible to query "3 pm on Sep. 10, 1999." Additionally, if one made the new entity, then one would not be able to simply query "John;" one would have to query "John at 3 pm on Sep. 10, 1999." Further, if one made the new relation, then one would not be able to query "favorite;" one would have to query "at 3 pm on Sep. 10, 1999 favors." And the problem compounds and multiplies as one has to create additional entities or relations for every combination and permutation of time and/or place for each entity and/or relation. Evidently, both increase in size of the database and decrease in functionality result.

At this point, one can adjust these tables in various ways to add particular capabilities or speed optimizations, such as moving the Phrase Names to another table (to add Phrase Comments, Abbreviations, or other Wordings). Multiple virtual tables can be created, with sentences relating phrases spanning these tables. These variations are guided by the data container layout. In some embodiments, the data can be packaged or stored in other formats, such as XML text files, or in XML Storage containers.

The tables of any relational database, semantic or otherwise, carry primary keys and foreign keys to identify the entities and relations in the system. The semantic relational database is a design that provides universal containers. Structurally, this would make it easier to move data from one container to another. However, if the primary and foreign keys are unique to only one database container, this makes it more difficult to move and relate data between systems. Using a robust multi-part global key, such as the following design, in a semantic relational database will remove the barriers and create a global data distribution capability.

A sample multi-part global key can be made of five optional parts, of which two primary parts provide minimum unique identification, two secondary parts add maximum unique identification, and one control part adds insert management for nondestructive updates and deletions. Unless noted otherwise, each part could be of any standard type usable for a relational key, such as a 64-bit integer. The primary identification is made of two parts: an Install ID and an Item ID. An Install ID represents the unique system or subsystem that this item was created in, and it will be helpful to maintain a registry of such Install IDs. The Item ID represents the unique identifier for any item within that system or subsystem. Combined together, these two parts assure unique identity for data across the world, enabling free flow, location, and tracking of data.

Additional secondary parts of the multi-part key include a Timestamp and a Utility Number, adding more capabilities. The Timestamp is a date-time or other incremental value used to track and discriminate changes of the values identified by the Install Number and Item Number. Each new change can be added as new rows stored with a new date-time stamp allowing identification of the newest permutation of the value. Another part, the Utility Number, is a number generated for several useful features. For example, it may be a randomly generated number used for temporary transaction identification, additional row discrimination, or page anti-lock optimization.

An additional control part of the multi-part key, the UpdateTracking part, is used with the Timestamp to provide the capability of nondestructive changes in the data. For example, during data updates, instead of overwriting previous rows, a new row is written with a new Timestamp, and this UpdateTracking part would be given a value to mark that it is an Insert or a Delete. This part is normally not indexed nor used in a foreign key, but acts as a modifier to the interpretation of any value content to the row. This combination gives important capabilities to the system. It allows the existence and tracking of all permutations of data simultaneously in the system. All changes are nondestructive to the past state of the data. A data handler can be told to search data only before a particular Timestamp, allowing a nondestructive rollback capability. This capability means that a state of the system can be "frozen" in place to a point in time, "copied" without physically copying, and the state can be saved as a named Project phrase, modified, generating parallel what-if data states in a very efficient manner. Complex capabilities can be developed, such as Projects that can share data from combined states of the same or other Projects, or, Projects that can contain many configurations, such as Weekday, Weekend, Night, and Emergency.

Using a combination of tables of the disclosed semantic relational database, any combination of required subsystems can be created. A typical layout style is to create three standard subsystems: (a) Security Control; (b) Project Control; and (c) Standard Content. There is flexibility in how systems can be created. For example, each subsystem can be created out of multiple tables. Alternatively, separate subsystems can be combined into a single table. A set of control tables can hold the information specifying the general schema layout and other information controlling overall system operation. Combining the layout tables with the semantic tables, subsystems can define sentences that span subsystems. For example, the Project Control table holds sentences that specify which data in the Standard Content belong to a project. This ultimately defines the connections that tie the whole system together.

In some embodiments, a communication channel can be modeled as a semantic relational database, using the global key, serial data packaging, and a transport mechanism such as TCP/IP. Combining the semantic relational database with the semantic relational communication channel will create a semantic relational Internet, especially with the addition of Semantic Web Pages.

Figure 5:
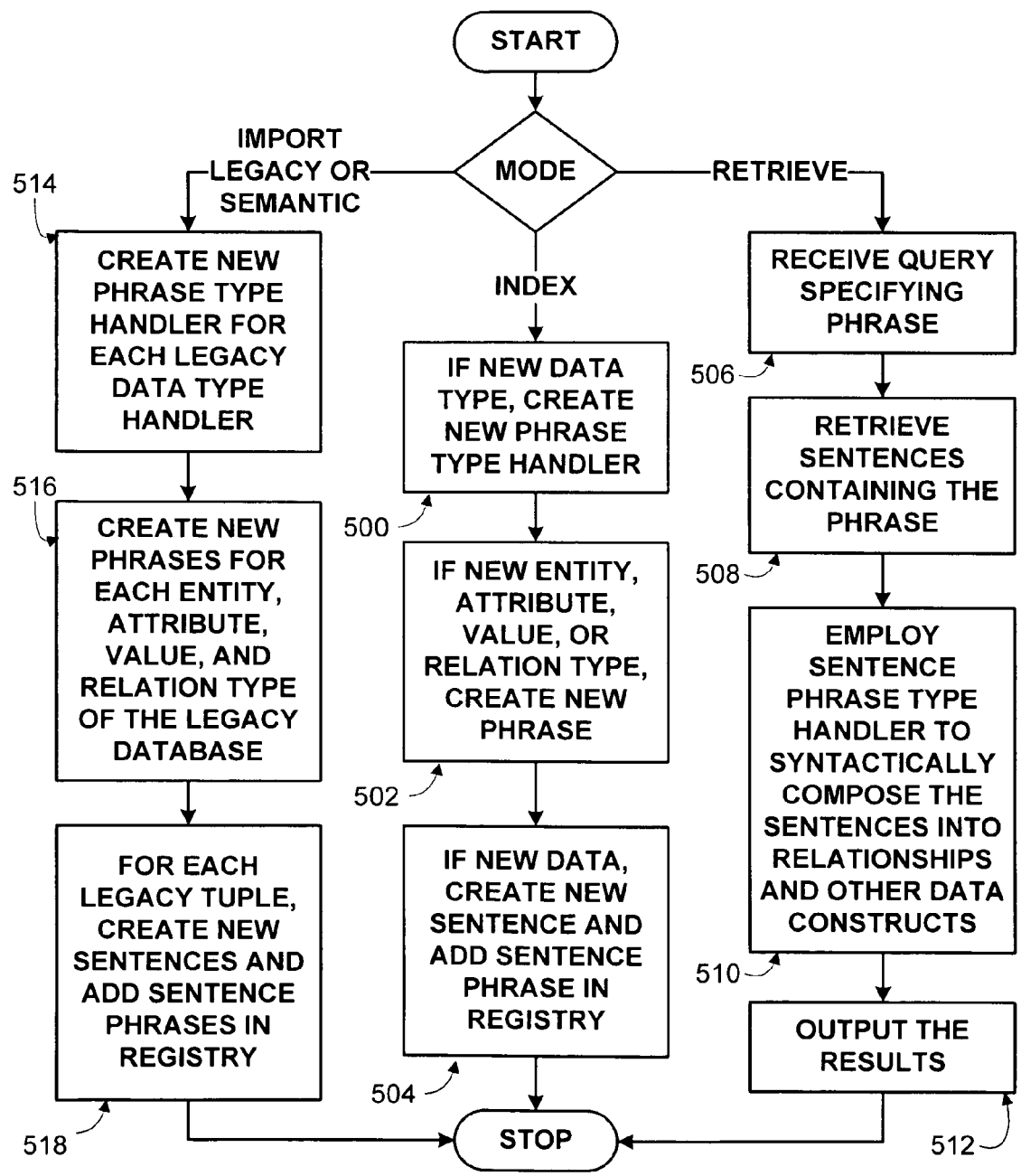
FIG. 5 is a flow diagram illustrating a method of operation for use with an index and retrieval system of a semantic relational database.

Turning now to FIG. 5, a method of operation for an index and retrieval system of the semantic relational database system can index data, retrieve data, and/or import a legacy relational database. In an index mode of operation, a new data handler is added to the system at step 500 by creating a new phrase type handler. For example, a data handler for processing data of a previously unknown format can be added to the phrase type table. At step 502, new phrase definitions are created in the phrase registry table for new entities and/or new relation types. These phrase definitions are labeled by phrase type so that the appropriate data handler can be identified. In the case of a new relationship or attribute instance, a new sentence is created at step 504, and the sentence is added as a sentence type entity to the phrase registry table.

The process for creating the sentence involves the user selecting a pre-defined relationship type to be a verb, selecting a predefined entity as a subject, and selecting a predefined entity as an object. One or more of these entities can be a predefined sentence. In some cases, the user selects as modifiers additional predefined entities to modify the verb, subject or object. In still further cases, the user selects more predefined entities to modify the modifiers.

During a retrieval process mode, a user query is received at step 506. This query specifies at least one phrase definition, such as a word phrase, timestamp, picture, sound, or sentence. Additional query operators can also be specified for processing retrieved data. For each phrase definition, each sentence containing the phrase definition is retrieved at step 508. These sentences are syntactically traversed at step 510 by employing the sentence phrase type handler. Relationships between entities are obtained at step 510. Optionally, these relationships are processed by using the operators that can be optionally defined in the query. The relationships and/or entities are then output to a user at step 512.

There are various ways to syntactically traverse the data to query for information. The most common method is to search for all sentences that refer to a specific phrase, giving all data connected to that phrase. Another type of syntactical traversal is to search for all subjects of a sentence that holds a specific verb type. This is useful when a verb means "contain" and the subjects are the "Containers".

An example of a query for all sentences that refer to a specific phrase follows: First, the user would select a search phrase from the PhraseRegistryTable 200, and using the PhraseKey value from that row, search the ValueSentence table 400 for all rows that the SSPhraseKey is equal to the search PhraseKey. Each matching row found in the ValueSentence table has a SentenceKey 406, which is used to search the ValueSentence table for all rows that contain the same SentenceKey. We now have all rows of all sentences that contain the search phrase.

During an import mode, the steps 500-504 are performed iteratively to import all of the data in the legacy or semantic relational database. For example, at step 514, new phrase type handlers are created for each new data type. Also, new phrase definitions are created at step 516 for each entity, attribute, and relationship type in the import database. Next, new sentences are created at step 518 for each import relationship or attribute, and these sentences are added as sentence phrase definitions. Thereafter, users can add new data handlers, data entities, and relationship instances in an extensible fashion according to steps 500-504. Also, users can retrieve the legacy data and the new data according to steps 506-512.

The above description is merely exemplary in nature and is not intended to limit the present disclosure, application, or uses.

What is claimed is:

1. A semantic relational database, comprising:
a phrase registry data store of definitions recorded in a tangible non-transitory computer readable medium, wherein the phrase registry data store stores phrase definitions that include word phrase definitions and sentence phrase definitions, and the word phrase definitions include data entity type phrase definitions and relationship type phrase definitions;
a sentence data structure recorded in the computer readable medium, wherein said sentence data structure stores sentences composed of three or more of the phrase definitions according to constraints, wherein the sentences are instances of relationships between two of the phrase definitions, the relationships are defined by the relationship type phrase definitions, and the constraints permit at least one of the relationship type phrase definitions to define a relationship between the sentence phrase definition and another of the phrase definitions;
at least two data handlers recorded in the computer readable medium that syntactically traverse sentences of said sentence data structure, including at least one sentence that refers to at least one other sentence by containing a sentence phrase definition for the other sentence, and report word phrases of relationships defined in the sentences; and
an index and retrieval system receiving at least one query phrase definition from the user and processing the query phrase definition by accessing the computer readable medium and employing a sentence data handler, contingent on the query phrase definition matching a phrase definition of the sentence at least partly composed of the sentence phrase definition for the other sentence, to retrieve the sentence and the other sentence and to syntactically traverse the sentence and the other sentence into an ordered representation of at least two relationships defined by those two sentences, and by employing a word phrase data handler to report to the user data entities of the two sentences in an order determined by the ordered representation.

2. The semantic relational database of claim 1, wherein the phrase definitions include at least sentence phrase definitions and one or more other types of phrase definition.

3. The semantic relational database of claim 2, wherein the one or more other types of phrase definitions include at least one of word phrase definitions, picture definitions, sound definitions, and timestamp definitions.

4. The semantic relational database of claim 1, wherein said phrase registry data store of definitions refers to a stored data item by a multipart key.

5. The semantic relational database of claim 4, wherein the multipart key is made of five parts, including an Install ID representing a registered database system in which the data item was created, an Item ID representing the data item within its registered database system, a Utility Number ensuring row key uniqueness, anti-lock optimization, and temporary processing identification, a Timestamp that is a date-time value used to track and discriminate upgrades and edits of the value of the data item identified by the Install Number and the Item Number and the Utility Number, and an Update Tracking flag used to track whether the data is inserted, deleted or other mode.

6. A semantic relational database, comprising:
a phrase registry data store of definitions recorded in a tangible non-transitory computer readable medium, wherein the phrase registry data store stores phrase definitions that include word phrase definitions and sentence phrase definitions, and the word phrase definitions include data entity type phrase definitions and relationship type phrase definitions;

a syntax type data structure recorded in the computer readable medium and stores a subject syntax type, a verb syntax type, and a predicate object syntax type;

a sub-sentence data structure recorded in the computer readable medium and storing sentences as sub-sentences having syntax types, wherein at least one sub-sentence of a sentence is designated to modify another sub-sentence of that sentence by a reference to the other sub-sentence, said sub-sentence data structure records at least four sub-sentences, wherein at least three of the at least four sub-sentences are each at least composed of one of the phrase definitions and one of the syntax types specifying a role of that sub-sentence's phrase definition in a relationship defined by those three sub-sentences, and a fourth sub-sentence of the at least four sub-sentences is at least composed of another one of the phrase definitions and an identification of one of the three-sub-sentences to be modified by the fourth sub-sentence's phrase definition;

at least two data handlers recorded in the computer readable medium that syntactically traverse sentences of said sub-sentence data structure and report word phrases of relationships defined in the sentences as modified by the reference of the sub-sentence to the other sub-sentence; and an index and retrieval system receiving at least one query phrase definition from the user and processing the query phrase definition by employing a sentence data handler, contingent on the query phrase definition matching one or more of the phrase definitions of which the at least four sentences are composed, to retrieve a sentence composed of the at least four sub-sentences and syntactically traverse the at least four sub-sentences into an ordered representation of a modified relationship specified by the syntax type of each of the at least three sub-sentences and the identification of which of the at least three sub-sentences is modified by the fourth sub-sentence's phrase definition, and by employing a word phrase data handler to report to the user data entities of the sentences in an order determined by the ordered representation.

7. The semantic relational database of claim 6, wherein the phrase definitions include at least sentence phrase definitions and one or more other types of phrase definition.

8. The semantic relational database of claim 7, wherein the one or more other types of phrase definitions include at least one of word phrase definitions, picture definitions, sound definitions, and timestamp definitions.

9. The semantic relational database of claim 6, wherein said phrase registry data store of definitions refers to a stored data item by a multipart key.

10. The semantic relational database of claim 9, wherein the multipart key is made of five parts, including an Install ID representing a registered database system in which the data item was created, an Item ID representing the data item within its registered database system, a Utility Number ensuring row key uniqueness, anti-lock optimization, and temporary processing identification, a Timestamp that is a date-time value used to track and discriminate upgrades and edits of a value of the data item identified by the Install Number and the Item Number and the Utility Number, and an Update Tracking flag used to track whether the data is inserted, deleted or other mode.

11. A semantic relational database system, comprising:
a phrase registry data store of definitions recorded in a computer readable medium and storing phrase definitions that include word phrase definitions and sentence phrase definitions, wherein the word phrase definitions include data entity type phrase definitions and relationship type phrase definitions;

a sentence data structure recorded in the computer readable medium and storing sentences composed of three or more of the phrase definitions according to constraints, wherein the sentences are instances of relationships between two of the phrase definitions, the relationships are defined by the relationship type phrase definitions, and the constraints permit at least one of the relationship type phrase definitions to define a relationship between a sentence phrase definition and another of the phrase definitions;

at least two data handlers recorded in the computer readable medium, including a sentence data handler and a word phrase data handler; and an index and retrieval system receiving at least one query phrase definition from a user and processing the query phrase definition by accessing the computer readable medium and employing the sentence data handler, contingent on the query phrase definition matching a phrase definition of a sentence at least partly composed of a sentence phrase definition for another sentence, to retrieve the sentence and the other sentence and to syntactically traverse the sentence and the other sentence into an ordered representation of at least two relationships defined by those two sentences, and by employing the word phrase data handler to report to the user data entities of the two sentences in an order determined by the ordered representation.

12. A semantic relational database system, comprising:
a phrase registry data store of definitions recorded in a computer readable medium and recording phrase definitions that include word phrase definitions, wherein the word phrase definitions include data entity type phrase definitions and relationship type phrase definitions;

a sub-sentence data structure recorded in the computer readable medium and recording at least four sub-sentences, wherein at least three of the at least four sub-sentences are each at least composed of one of the phrase definitions and a syntax type specifying a role of that sub-sentence's phrase definition in a relationship defined by those three sub-sentences, and a fourth sub-sentence of the at least four sub-sentences is at least composed of a phrase definition and an identification of one of the three-sub-sentences to be modified by the fourth sub-sentence's phrase definition;

at least two data handlers, including a sentence data handler and a word phrase data handler; and an index and retrieval system receiving at least one query phrase definition from a user and processing the query phrase definition by employing the sentence data handler, contingent on the query phrase definition matching one or more of the phrase definitions of which the at least four sentences are composed, to retrieve a sentence composed of the at least four sub-sentences and syntactically traverse the at least four sub-sentences into an ordered representation of a modified relationship specified by the syntax type of each of the at least three sub-sentences and the modifier target identification of the fourth sub-sentence's phrase definition, and by employing the word phrase data handler to report to the user data entities of the sentences in an order determined by the ordered representation.

13. The semantic relational database of claim 4, wherein the multipart key is made of four parts, including an Install ID representing a registered database system in which the data item was created, an Item ID representing the data item within its registered database system, a Timestamp that is a date-time value used to track and discriminate upgrades and edits of the value of the data item identified by the Install Number and the Item Number, and an Update Tracking flag used to track whether the data is inserted, deleted or other mode.

14. The semantic relational database of claim 4, wherein the multipart key is made of four parts, including an Item ID representing the data item within its database system, a Utility Number ensuring row key uniqueness, anti-lock optimization, and temporary processing identification, a Timestamp that is a date-time value used to track and discriminate upgrades and edits of the value of the data item identified by the Item Number and the Utility Number, and an Update Tracking flag used to track whether the data is inserted, deleted or other mode.

15. The semantic relational database of claim 4, wherein the multipart key is made of three parts, including an Install ID representing a registered database system in which the data item was created, an Item ID representing the data item within its registered database system, a Timestamp that is a date-time value used to track and discriminate upgrades and edits of the value of the data item identified by the Install Number and the Item Number.

16. The semantic relational database of claim 4, wherein the multipart key is made of two parts, including an Install ID representing a registered database system in which the data item was created, and an Item ID representing the data item within its registered database system.

17. The semantic relational database of claim 9, wherein the multipart key is made of four parts, including an Install ID representing a registered database system in which the data item was created, an Item ID representing the data item within its registered database system, a Timestamp that is a date-time value used to track and discriminate upgrades and edits of a value of the data item identified by the Install Number and the Item Number, and an Update Tracking flag used to track whether the data is inserted, deleted or other mode.

18. The semantic relational database of claim 9, wherein the multipart key is made of four parts, including an Item ID representing the data item within its database system, a Utility Number ensuring row key uniqueness, anti-lock optimization, and temporary processing identification, a Timestamp that is a date-time value used to track and discriminate upgrades and edits of a value of the data item identified by the Item Number and the Utility Number, and an Update Tracking flag used to track whether the data is inserted, deleted or other mode.

19. The semantic relational database of claim 9, wherein the multipart key is made of three parts, including an Install ID representing a registered database system in which the data item was created, an Item ID representing the data item within its registered database system, a Timestamp that is a date-time value used to track and discriminate upgrades and edits of a value of the data item identified by the Install Number and the Item Number.

20. The semantic relational database of claim 9, wherein the multipart key is made of two parts, including an Install ID representing a registered database system in which the data item was created, and an Item ID representing the data item within its registered database system.

21. The semantic relational database of claim 11 wherein said phrase registry data store of definitions refers to a stored data item by a multipart key, the multipart key comprised of at least two parts, including an Install ID representing a registered database system in which the data item was created, and an Item ID representing the data item within its registered database system.

22. The semantic relational database of claim 21 wherein the multipart key further includes a Timestamp that is a date-time value used to track and discriminate upgrades and edits of a value of the data item identified by the Install Number and the Item Number.

23. The semantic relational database of claim 22 wherein the multipart key further includes an Update Tracking flag used to track whether the data is inserted, deleted or other mode.

24. The semantic relational database of claim 11 wherein said phrase registry data store of definitions refers to a stored data item by a multipart key, the multipart key comprised of at least two parts, including an Item ID representing the data item within its registered database system and a Timestamp that is a date-time value used to track and discriminate upgrades and edits of a value of the data item identified by the Item Number.

25. The semantic relational database of claim 24 wherein the multipart key further includes an Update Tracking flag used to track whether the data is inserted, deleted or other mode.

26. The semantic relational database of claim 12 wherein said phrase registry data store of definitions refers to a stored data item by a multipart key, the multipart key comprised of at least two parts, including an Install ID representing a registered database system in which the data item was created, and an Item ID representing the data item within its registered database system.

27. The semantic relational database of claim 26 wherein the multipart key further includes a Timestamp that is a date-time value used to track and discriminate upgrades and edits of a value of the data item identified by the Install Number and the Item Number.

28. The semantic relational database of claim 27 wherein the multipart key further includes an Update Tracking flag used to track whether the data is inserted, deleted or other mode.

29. The semantic relational database of claim 12 wherein said phrase registry data store of definitions refers to a stored data item by a multipart key, the multipart key comprised of at least two parts, including an Item ID representing the data item within its registered database system and a Timestamp that is a date-time value used to track and discriminate upgrades and edits of a value of the data item identified by the Item Number.

30. The semantic relational database of claim 29 wherein the multipart key further includes an Update Tracking flag used to track whether the data is inserted, deleted or other mode.

31. A semantic relational database, comprising:
a phrase registry data store of definitions recorded in a tangible non-transitory computer readable medium, wherein said phrase registry data store of definitions refers to a stored data item by a multipart key, the multipart key comprised of at least two parts, including an Install ID representing a registered database system in which the data item was created, and an Item ID representing the data item within its registered database system;

a sentence data structure recorded in the computer readable medium; and at least two data handlers recorded in the computer readable medium that syntactically traverse sentences of said sentence data structure, including at least one sentence that refers to at least one other sentence by containing a sentence phrase definition for the other sentence, and report word phrases of relationships defined in the sentences.

32. The semantic relational database of claim 31 wherein the multipart key further includes a Timestamp that is a date-time value used to track and discriminate upgrades and edits of a value of the data item identified by the Install Number and the Item Number.

33. The semantic relational database of claim 32 wherein the multipart key further includes an Update Tracking flag used to track whether the data is inserted, deleted or other mode.

34. A semantic relational database, comprising:

a phrase registry data store of definitions recorded in a tangible non-transitory computer readable medium, wherein said phrase registry data store of definitions refers to a stored data item by a multipart key, the multipart key comprised of at least four parts, including an Item ID representing the data item within its database system, a Utility Number ensuring row key uniqueness, a Timestamp that is a date-time value used to track and discriminate upgrades and edits of the value of the data item identified by the Item Number and the Utility Number, and an Update Tracking flag used to track whether the data is inserted, deleted or other mode;

a sentence data structure recorded in the computer readable medium; and at least two data handlers recorded in the computer readable medium that syntactically traverse sentences of said sentence data structure, including at least one sentence that refers to at least one other sentence by containing a sentence phrase definition for the other sentence, and report word phrases of relationships defined in the sentences.

35. A semantic relational database, comprising:

a phrase registry data store of definitions recorded in a tangible non-transitory computer readable medium, wherein said phrase registry data store of definitions refers to a stored data item by a multipart key, the multipart key comprised of at least two parts, including an Install ID representing a registered database system in which the data item was created, and an Item ID representing the data item within its registered database system;

a syntax type data structure recorded in the computer readable medium;

a sub-sentence data structure recorded in the computer readable medium and storing sentences as sub-sentences having syntax types, wherein at least one sub-sentence of a sentence is designated to modify another sub-sentence of that sentence by a reference to the other sub-sentence; and at least two data handlers recorded in the computer readable medium that syntactically traverse sentences of said sub-sentence data structure and report word phrases of relationships defined in the sentences as modified by the reference of the sub-sentence to the other sub-sentence.

36. The semantic relational database of claim 35 wherein the multipart key further includes a Timestamp that is a date-time value used to track and discriminate upgrades and edits of a value of the data item identified by the Install Number and the Item Number.

37. The semantic relational database of claim 36 wherein the multipart key further includes an Update Tracking flag used to track whether the data is inserted, deleted or other mode.

38. A semantic relational database, comprising:

a phrase registry data store of definitions recorded in a tangible non-transitory computer readable medium, wherein said phrase registry data store of definitions refers to a stored data item by a multipart key, the multipart key comprised of at least four parts, including an Item ID representing the data item within its database system, a Utility Number ensuring row key uniqueness, a Timestamp that is a date-time value used to track and discriminate upgrades and edits of the value of the data item identified by the Item Number and the Utility Number, and an Update Tracking flag used to track whether the data is inserted, deleted or other mode;

a syntax type data structure recorded in the computer readable medium;

a sub-sentence data structure recorded in the computer readable medium and storing sentences as sub-sentences having syntax types, wherein at least one sub-sentence of a sentence is designated to modify another sub-sentence of that sentence by a reference to the other sub-sentence; and at least two data handlers recorded in the computer readable medium that syntactically traverse sentences of said sub-sentence data structure and report word phrases of relationships defined in the sentences as modified by the reference of the sub-sentence to the other sub-sentence.

* * * * *